United States Patent [19]

Barnard

[11] 4,085,543

[45] Apr. 25, 1978

[54] HEAT DISTRIBUTION SYSTEM

[76] Inventor: Edwin Ralph Barnard, 305 Boca Ciega Pt. Blvd., St. Petersburg, Fla. 33708

[21] Appl. No.: 762,834

[22] Filed: Jan. 27, 1977

[51] Int. Cl.² .................... A01G 15/00; E01H 13/00
[52] U.S. Cl. .......................................... 47/2; 239/2 R
[58] Field of Search ......................... 47/2, 1; 239/2 R

[56] References Cited

U.S. PATENT DOCUMENTS

| 661,898 | 11/1900 | Tucker | 47/2 |
| 1,688,802 | 10/1928 | Crowhurst | 47/2 |
| 1,758,941 | 5/1930 | Gibson | 47/2 X |
| 3,470,943 | 10/1969 | Van Huisen | 47/2 X |
| 3,755,961 | 9/1973 | McIsaac | 47/2 |
| 3,788,542 | 1/1974 | Mee | 47/2 X |

FOREIGN PATENT DOCUMENTS

| 528,468 | 11/1921 | France. |
| 2,501,796 | 7/1975 | Germany. |

Primary Examiner—Robert E. Bagwill
Attorney, Agent, or Firm—Arthur W. Fisher, III

[57] ABSTRACT

A heat distribution system to supply heated water in close proximity to foliage to be protected from the effects of low temperatures wherein heat from the water is conducted through conduits to the ground and to spray a fine warm mist of water near the foliage so as to raise the air temperature in the vicinity thereof to protect the foliage from frost damage. The heat distribution system comprises a water supply, an auxiliary heater, and a network of conduits having an inlet and an outlet header. The network of conduits comprises a plurality of primary conduits and a plurality of auxiliary conduits having nozzles disposed above the surface of the ground. The plurality of conduits includes a plurality of substantially parallel legs to more efficiently conduct the heat to the ground evenly along the area to be protected.

2 Claims, 1 Drawing Figure

HEAT DISTRIBUTION SYSTEM

BACKGROUND OF THE INVENTION

1. Field of the Invention

A heat distribution system to supply heated water for conduction of heat through conduits in close proximity of foliage to be protected from the effects of low temperatures and to spray a fine mist of water near the foliage to protect the foliage from frost damage.

2. Description of the Prior Art

It is well known that certain foliage is particularly prone to frost damage when the ambient air temperature drops close to freezing. Moreover, the temperature range between which such foliage will experience permanent frost damage and which it can withstand without any significant damage is extremely narrow. This temperature range is often on the order of 4°. Thus, an ambient temperature of 28° or lower will cause permanent damage while a temperature of 31° or higher will cause no significant damage.

Numerous techniques have been devised to protect such foliage from frost damage. One such technique or method employs smudge pots to heat the air and create convection air currents around the foliage. Another method involves the use of large motor driven fans to introduce air circulation about the foliage. Such air circulation has a dual effect of lowering the minimum air temperature which the foliage can withstand while raising the air temperature.

While both the smudge pot and air circulation methods of frost protection are in current widespread use, they suffer from certain serious inherent disadvantages. Each is quite costly to install and maintain. Further, the smudge pot method produced air contamination and requires a large number of pots which must be either individually fueled and ignited or provided with a costly central fueling and automatic ignition system. Air circulating fans, on the other hand, are noisy and present periodic servicing, maintenance and repair problems.

Another method uses various distribution apparatus. For example, a series of thermal radiators using heated liquid for radiation to the area about the foliage.

As seen, the prior art has been concerned primarily with heating the air around the foliage. There is at present a need for efficient and inexpensive means for additionally maintaining the temperature of the ground around the root system of the foliage at sufficient temperatures to keep the root systems from dying due to the cold temperatures. Presently, the cumbersome and time consuming method of banking up or adding dirt around the foliage is used. During periods of warm weather, these banks must be removed to prevent rotting Thus, during a winter season, especially in semi-tropical areas such as Florida, the foliage may have to be banked up several times.

Thus, there is a long felt need for an efficient and inexpensive heat distribution systems to heat both the air and ground around the foliage to provide the best protection against cold temperatures.

SUMMARY OF THE INVENTION

The present invention relates to a heat distribution system wherein heated water is distributed to conduits disposed in close proximity to foliage to be protected from the effects of low temperatures. Heat from the heated water is conducted to the conduits, to the air in close proximity to the foliage.

The heat distribution system comprises a water supply means to supply water to the system, an auxiliary heater means to heat the water to a predetermined temperature for adequate protection of the foliage, and a network of conduit means having a plurality of conduit means disposed in close proximity to the foliage to be protected. The heat distribution system further comprises a water return means to redirect the water to the water supply means after the water has passed through the network of conduit means and has exchanged heat. In addition to being operatively coupled to the water return means, the water supply means is operatively coupled to a water make up means which is used to supply make up water as needed to the system from a reservoir or source. The water supply means pumps or otherwise supplies the water through the auxilliary heater means and into the conduit means where the heat is conducted to the foliage. The water is then returned to the water supply means through the water return means.

The network of conduit means comprises an inlet header, an outlet header, a plurality of primary conduit means, and a plurality of auxilliary conduit means.

Each primary conduit means comprises a plurality of legs including a first leg wherein the flow of water is from the inlet header to a point substantially near the outlet header, a second leg disposed in substantially close proximity to and substantially parallel to the first wherein the flow of water is to a point substantially near the inlet header, and a third leg disposed in substantially close proximity to and substantially parallel to the second leg wherein the flow of water is to the outlet header. With the plurality of legs as described, the greatest percentage of heat is conducted to the foliage through the first leg with the foliage near the outlet header receiving comparatively less heat. A lesser amount of heat is conducted through the second leg with the foliage near the outlet header receiving comparatively greater heat. A relatively smaller amount of heat is conducted through the third leg with the foliage near the outlet header receiving a comparatively lesser amount of heat. Thus, all foliage heated by a single conduit means between the inlet and outlet headers will receive substantially equal amounts of heat.

The plurality of auxilliary conduit means, which may also be used for irrigation purposes by amaking appropriate adjustments are operatively coupled to the inlet header and disposed above the surface of the ground in close proximity to the foliage. Each auxilliary conduit means includes a plurality of nozzle means which spray a fine, warm mist of water near the foliage so as to raise the air temperature in the vicinity thereof.

The heat distribution system further comprises means for controlling the water supply means at certain predetermined air temperatures, an automatic temperature control means for controlling the temperature of the water leaving the auxilliary heater means, a first plurality of valve means to permit the auxilliary heater means to be bypassed and a second plurality of valve means to permit the primary conduit means and auxilliary conduit means to be selectively isolated as desired.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawing in which.

Similar reference characters refer to similar parts throughout the several views of the drawing.

DETAILED DESCRIPTION OF THE PREFERRED EMBODIMENT

Figure 1:
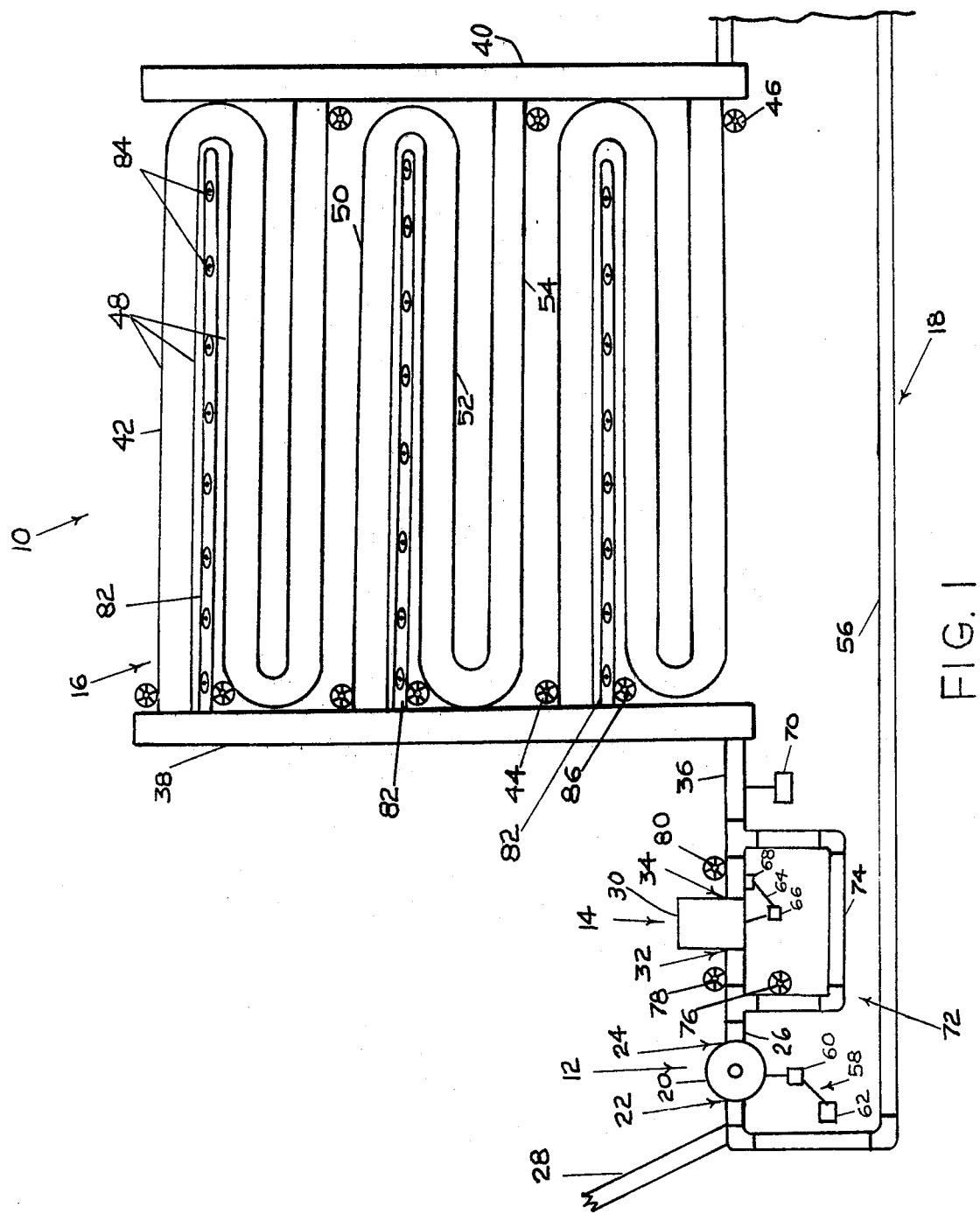
FIG. 1 is a schematic view of a heat distribution system.

As shown in FIG. 1, the present invention relates to a heat distribution system generally indicated as 10 wherein heated water is distributed to conduits disposed in substantially close proximity to foliage to be protected from the effects of low temperatures. Heat from the heated water is conducted to the conduit, then to the ground in close proximity to the foliage.

The heat distribution system 10 comprises a water supply means 12 to supply water to the system, an auxilliary heater means 14 to heat the water to a predetermined temperature for adequate protection of the root structures of the foliage and a network of conduit means 16 having a plurality of primary conduit means disposed under the surface of the ground in close proximity to the foliage to be protected. The relative distance from the foliage and the relative distance under the surface of the ground will vary and will depend on the various characteristics of the particular foliage to be protected. In fact, for some plants, it might be most advantageous to dispose the conduit means on top of the ground. The heat distribution system further comprises a water return means 18 to re-direct or recycle the water to the water supply means 12 after it has passed through the network of conduit means 18 and has given up or exchanged its heat.

The water supply means 12 comprises a pump 20 or other means for transferring water to the network of conduit means 16, pump inlet means 22, to which the water return means 18 is operatively coupled, a pump outlet means 24, and a pump outlet conduit means 26 operatively coupled to the pump outlet means 24 whereby the pump 20 takes water from the water return means 18 through the pump inlet means 22 and discharges it through the pump outlet means 24 into the pump outlet conduit means 26. The pump inlet means 22 is also operatively coupled to a water make up means 28 which is used to supply make up water as needed to the system from a reservoir or source (not shown).

The auxilliary heater means 14 comprises a heater 30, a heater inlet means 32 operatively coupled to the pump outlet conduit means 26 to receive water discharged from the pump 20 a heater outlet means 34 and a heater outlet conduit means 36 operatively coupled to the heater outlet means 34, to receive the water from the heater 30 after it is heated to a predetermined water temperature for most efficient heating of the foliage.

The network of conduit means 16 comprises an inlet header 38 operatively coupled to the heater outlet conduit means 36 to receive heated water therefrom, an outlet header 40 operatively coupled to the water return means 18 to discharge water thereto after it has given up or exchanged its heat, and the plurality of primary conduit means 42 such as flexible plastic tubing having an inside diameter of 0.75 in. and a thickness of 0.032 in. or other pipe having good heat transfer properties operatively coupled at respective end portions thereof to the inlet and outlet headers 38 and 40 respectively. Each primary conduit means 42 includes inlet and outlet shut off valve means 44 and 46 respectively disposed on each respective end portion thereof so that each individual primary conduit means may be selectively operated. The exact configuration of the network of conduit means 16 may vary as long as there is a positive flow of water from the pump 20 through the system 10 to the water return means 18 so that colder water does not recirculate and cause the heating efficiency to decrease. The length of the primary conduit means 42 may vary but should be of sufficient length to efficiently utilize as much of the heat from the water as practical as the heated water passes therethtough, the temperature difference therebetween being increasingly less.

It has therefore been found that when a straight length of primary conduit means 42 is coupled between the inlet and outlet headers 38 and 40 respectively, the relative temperature of the water near the outlet header 40 is lower than the temperature of the water near the inlet header 38 due to the heat loss of the water as it passes through each primary conduit means 42. Consequently, a more efficient heat transfer is obtained for all foliage to be protected where each primary conduit means 42 comprises a plurality of legs 48 including a first leg 50 wherein the flow of water is from the inlet header 38 to a point substantially near the outlet header 40, a second leg 52 disposed in substantially close proximity to and substantially parallel to the first leg 50 wherein the flow of water is to a point substantially near the inlet header 38, and a third leg 54 disposed in substantially close proximity to and substantially parallel to the second leg 52 wherein the flow of water is to the outlet header 40. Each leg is disposed substantially the entire distance between said inlet header 38 and said outlet header 40. Additional legs may be added as become necessary or desirable. With the plurality of legs 48 as described, the greatest amount of heat is conducted to the ground and foliage at the first leg 50 with the ground around the foliage near the outlet header 40 receiving comparatively less heat. A lesser amount of heat is conducted to the ground at the second leg 52 with the ground around the foliage near the outlet header 40 receiving comparatively greater heat. A relatively small amount of heat is conducted to the ground at the third leg 54 with the ground around the foliage near the outlet header 40 receiving a comparatively lesser amount of this heat. This, all foliage heated by a single primary conduit means 42 between the inlet and outlet headers 38 and 40 respectively will receive substantially equal amounts of heat.

The water return means 18 comprises a return conduit 56 operatively coupled to the outlet header 40 at one end and to the pump inlet means 22 at the opposite end.

The pump 20 includes an automatic control means 58 having a cut on and cut off thermostat 60 operatively coupled to an air temperature sensor 62 to start the pump 20 at a first predetermined air temperature and stop the pump 20 at a second predetermined air temperature which should be a few degrees higher than the first predetermined air temperature to prevent short cycling.

The heater 30, which may be oil fired or electrically operated, includes an automatic temperature control means 64 having a thermostat 66 operatively coupled to a water temperature sensor 68 operatively coupled to the heater inlet means 32 to sense the temperature of water exiting the heater 30 and input it into the thermostat 66 which in turn operates the heater 30 to heat the water to the predetermined water temperature. An outlet thermometer 70 is installed at the heater outlet means 34 to permit a person to check the temperature of the water delivered to the network of conduit means 16. A heater by-pass 72 having a by-pass conduit 74 with a by-pass valve 76 operatively coupled thereto is operatively coupled at one end to the pump outlet conduit means 26 and at the other end to the heater outlet conduit means 36. Heater shut off inlet and outlet valves 78 and 80 respectively are operatively coupled to the heater inlet and outlet means 32 and 34 respectively.

The network of conduit means 16 further comprises a plurality of auxilliary conduit means 82 operatively coupled to the inlet header 38 and disposed in close proximity to the foliage and on top of or above the surface of the ground and generally parallel to the primary conduit means 42. Each auxilliary conduit means 82 includes a plurality of nozzle means 84 or other generally accepted means for releasing the heat from the water to the space around the foliage. The nozzle means 84 which are coupled to the auxilliary conduit means spray a fine warm mist of water near the foliage so as to raise the air temperature in the vicinity thereof, and an auxilliary inlet shut off valve means 86. The other end of the auxilliary conduit means 82 is not open to the flow of water and does not engage the outlet header 40 so that the only flow of water therein is through the nozzle means 84.

The method of operation of the heat distribution system 10 comprises the steps of disposing the plurality of conduit means 42 either under or on the surface of the ground in substantially close proximity to the foliage and disposing the plurality of auxilliary conduit means 82 above the surface of the ground in substantially close proximity to the foliage. Water is then supplied by the water supply means 12 and heated by the auxilliary heater means 14 before it is supplied to the inlet header 38 of the network of conduit means 16. From there the water flows into the plurality of primary conduit means 42 where heat is conducted to the ground in the vicinity of the foliage, after which the water flows to the outlet header 40, then the water return means 18 and finally back to the water supply means 12. From the inlet header 38, the heated water may also be allowed to flow into the plurality of auxilliary conduit means 82 where it is sprayed by the plurality of nozzle means 84 into the atmosphere in the vicinity of the foliage so as to create a fine warm mist of water near the foliage so as to raise the air temperature in the vicinity thereof. In the event the water source is sufficiently warm the auxilliary heater means 14 may be by-passed.

In the preferred embodiment of this invention, it is desired to maintain the temperature around the foliage at over 40° F. To do this, efficiently, the pump 20 is set to cut on at first predetermined air temperature of 50° F and to cut off at a second predetermined air temperature of 52° F. The automatic temperature control means 64 is adjusted to heat the water to predetermined water temperatureoff 70° F.

The plurality of conduit means 82 can also be used for irrigation purposes by removing the plurality of nozzle means 84, cutting out the plurality of conduit means 42 by closing the inlet and outlet shut off valve means 44 and 46 respectively and by by-passing the heater means 14 so as to allow water to flow freely onto the ground near the foliage.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A heat distribution system for the protection of foliage during periods of low temperature by the conduction of heat from water in close proximity to the foliage, said heat distribution system comprises a water supply means including a pump to supply water to said heat distribution system, a pump inlet means to feed water to said pump, a pump outlet means to feed water from said pump and an automatic control means coupled to said pump to start said pump at a first predetermined air temperature and to stop said pump at a second predetermined air temperature, a network of conduit means including a plurality of primary conduit means disposed in close proximity to the foliage operatively coupled to said water supply means so that water from said water supply means flows through said plurality of primary conduit means wherein heat is transferred by conduction through said plurality of primary conduit means to the foliage and a heater means coupled between said pump means and said network of conduit means to selectively heat the water, said heater means including an automatic temperature control means and heater by-pass means to selectively feed water through said heater means to heat the water at a first predetermined temperature and through said heater by-pass means at a second predetermined temperature, said network of conduit means further comprises an inlet header and an outlet header, each said primary conduit means operatively coupled to said inlet header at one end and said outlet header at the opposite end, each said primary conduit means including an inlet shut off valve means and an outlet shut off valve means to selectively isolate any of said plurality of primary conduit means from said inlet header and said outlet header, said network of conduit means further comprises a plurality of auxiliary conduit means to afford additional protection of foliage during periods of low temperatures by spraying a mist of water near the foliage so as to raise the air temperature in the vicinity of the foliage, said auxiliary conduit means being operatively coupled to said water supply means so as to receive water therefrom, said auxiliary conduit means including a plurality of nozzle means operatively coupled thereto to spray the water near the foliage, each said auxiliary conduit means including an auxiliary inlet shut off valve means to selectively actuate each said auxiliary conduit means independent of each other and said primary conduit means, each said primary conduit means further comprises a plurality of legs to evenly distribute heat to the ground between said inlet header and said outlet header, said plurality of legs being substantially parallel, said plurality of legs comprises a first leg operatively coupled to said inlet header, a second leg operatively coupled to said first leg and a third leg operatively coupled at one end to said second leg and operatively coupled at the other end to said outlet header.

2. The heat distribution system of claim 1 further comprises a water return means coupled between said network of conduit means and said pump to direct the water to said water supply means after the water passes through the said network of conduit means.

* * * * *